Dec. 10, 1940.  A. KRAKAUER  2,224,824
SPRING CLIP
Filed Sept. 17, 1937
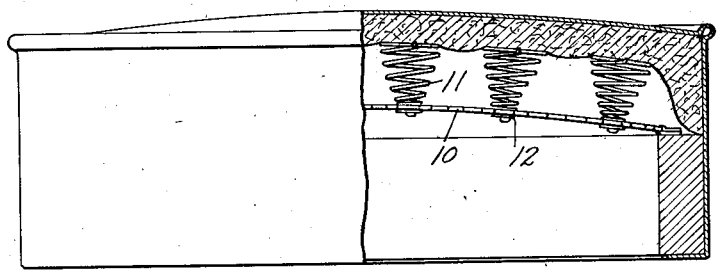
Fig. 1.
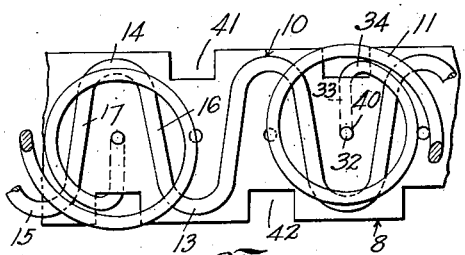
Fig. 5.
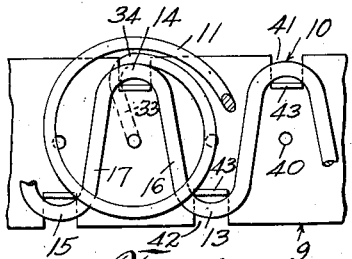
Fig. 6.
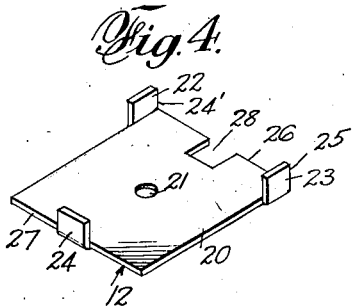
Fig. 2.
Fig. 4.
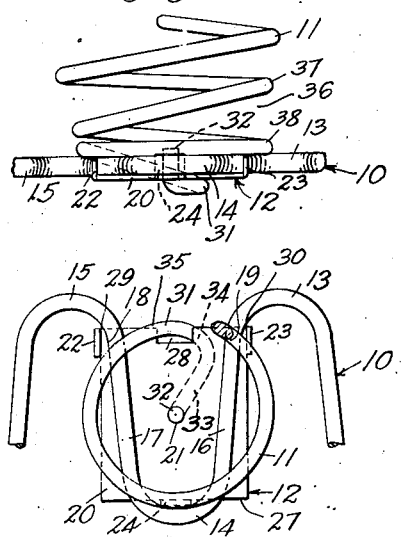
Fig. 3.
INVENTOR
Abraham Krakauer
BY
ATTORNEY

Patented Dec. 10, 1940

2,224,824

UNITED STATES PATENT OFFICE 2,224,824

SPRING CLIP

Abraham Krakauer, Brooklyn, N. Y., assignor to Kay Manufacturing Corporation, Brooklyn, N. Y., a corporation of New York Application September 17, 1937, Serial No. 164,273

10 Claims. (Cl. 155—179)

This invention relates to spring structures and particularly to the means for securing coil springs to sinuous springs, being an improvement of the devices shown in my prior copending application for patent for Spring structure, Serial No. 135,857, filed April 9, 1937, and which matured into Patent No. 2,156,728, issued May 2, 1939.

In my said prior application, I have disclosed a clip for removably securing a coil spring at its lowermost end to any desired point of a sinuous spring of the type known as "no-sag" springs, such as are shown in the patent to Kaden, No. 2,002,399, dated May 21, 1935.

Such sinuous springs, as commercially produced, are not precisely uniform, insofar as the dimensions of the various bends thereof and the precise spacing of said bends, are concerned. These inequalities, though slight, sometimes affect the proper fit of the clip shown in my said prior application to the sinuous spring.

My present invention therefore contemplates the provision of a simple spring holding means designed to hold the coil spring securely to any selected bend of the sinuous spring regardless of variations or inequalities in the widths and lengths of the various bends of the sinuous spring.

My invention further contemplates the provision of a simple spring connection designed to be economically produced and effective to hold the coil spring to and to press it against the sinuous spring firmly enough to prevent relative movement thereof in any direction except deliberate relative rotational movement.

My invention further contemplates the provision of a sheet metal connection whereby a coil spring may be firmly secured to any selected point of a sinuous spring and at substantially right angles thereto by means of relative rotational movement of said springs after the clip has been arranged in its selected position on the sinuous spring.

The various objects of my invention will be clear from the description which follows and from the drawing, in which, Fig. 1 is a vertical section of an article of furniture showing a frame thereof and showing an upholstered part supported by springs connected by my novel spring connection.

Fig. 2 is a fragmentary elevation of the connected springs showing one form of my invention in the form of a clip.

Fig. 3 is a top plan view of the same.

Fig. 4 is a perspective view of my new clip.

Fig. 5 is a top plan view of the spring assembly showing a modified form of the connection in the shape of a metal strip.

Fig. 6 is a similar view of another modified form thereof also in the shape of a strip.

In the practical embodiment of my invention which I have shown by way of example, the sinuous or "no-sag" spring 10 may be arranged in any suitable manner, as for example has been described in my said prior copending application and may be used to support one or more suitable coil springs 11. In one of the forms of my invention, the comparatively short clip 12 is used to removably secure the springs together, with the axis of the coil spring 11 at substantially right angles to the plane of the sinuous spring 10. In the other forms of my invention, a suitably notched and/or lugged strip 8 or 9 is used for the same purpose, said strip serving also as a reinforcement of the sinuous spring.

It will be noted that the clip 12 of the present invention, as well as the elongated strips 8 and 9 are intended to be used for the purpose of holding the coil spring to any desired point of the sinuous spring 10. As has been previously indicated, said spring 10 is provided with a plurality of bends 13, 14, 15, all of which are substantially semicircular in outline. The adjacent bends are connected by straight portions as 16 and 17. Said straight portions, however, are preferably not parallel, but diverge slightly from the ends of the semi-circular portions from which they project. In the manufacture of such sinuous springs, variations occur in the extreme overall lengths of the bends as from the outermost point of the bend 13 to the outermost point of the bend 14. Variations also occur in the widths of said bends as from the point 18 where the bend 15 joins the part 17 to the point 19 where the bend 13 joins the straight part 16. It therefore becomes advisable to use a connecting clip which is so constructed as to compensate for such variations and to permit no relative motion between the parts regardless of the exact widths or lengths of the bends.

A clip 12 having these properties is shown in detail in Fig. 4. Said clip is preferably made of a single piece of sheet metal and is provided with a bottom portion 20 having a substantially central perforation as 21 therein and provided with a pair of similar upstanding side lugs as 22 and 23 and with an end lug 24. Each of the lugs 22 and 23 is preferably of slightly less height than the thickness of the spring 10 and is integrally joined and bent from the bottom 20, the edges 24' and 25 of the respective lugs being arranged in substantially coplanar relation with the end edge 26 of the bottom 20. The widths of the respective lugs 22 and 23 are substantially immaterial, excepting that the lugs should be of sufficient width so that they are not likely to be bent or distorted under the stresses of use, and of less width than the lengths of the side edges of the clip.

The third lug 24 is preferably arranged centrally on the end edge 27 of the bottom 20 and its height may be somewhat greater than the height of the lugs 22 and 23. At the end edge 26 a notch as 28 may be formed, if desired, said notch aiding in holding the end coil of the coil spring in place, though it will be understood that said notch may be dispensed with without materially affecting the operation of the clip.

Referring particularly to Fig. 3, it will be seen that the clip 12 is arranged at the selected bend of the spring 10 by merely inserting the lug 24 inside of the selected bend as 14 and with the lugs 22 and 23 adajacent or in contact with the inner edges of the bends 15 and 13 respectively. The width of the bottom 20 of the clip and consequently the distance between said lugs 22 and 23, is preferably made to correspond with the minimum distance between the points of contact 29 and 30 of said lugs with the respective bends 15 and 13. Should the distance between said points of contact be greater than the minimum, the lugs 22 and 23 may, nevertheless, be forced inside of the respective bends 15 and 13 by transverse pressure owing to the fact that said lugs as well as the sinuous spring itself are sufficiently resilient for that purpose. Even, however, if the width of the selected bend between said points of contact is less than the minimum, there will be no lost motion between the parts as will shortly appear.

The clip 12 having been arranged as described at the selected bend of the spring 10, the coil spring may now be secured in place by the proper rotary motion. The lowermost coil 31 of said coil spring is provided with an axially arranged and comparatively short end portion or projection 32 designed to pass through the perforation 21 of the clip. Extending from said portion 32, is the radial portion 33 joined by the bend 34 to the adjacent part of the end coil 35. To secure the coil spring in place, the clip 12 and that part of the sinuous spring at which said clip is arranged, namely, the parts 14, 16 and 17, are inserted into any of the spaces as 36 between adjacent coils as 37 and 38 of the coil spring, above the end coil 31 and with the parts 32 and 33 underneath the bottom 20 of the clip. The upstanding part 32 in this position is in alignment with the perforation 21 ready to enter said perforation on the relative rotation of the coil spring and the sinuous spring. Such rotation in the proper direction, screws the coil spring axially along the spring 10 and the clip until the projection 32 passes through the opening 21, the end coil 31 then becoming arranged above the clip and in firm contact with the parts 14, 16 and 17. Said end coil preferably, though not necessarily, passes through the notch 28. The rotation above described may be continued until the parts are held together as firmly as may be necessary or desired.

It will be understood that similar rotation of the coil spring in the opposite direction relatively to the spring 10 loosens the parts and withdraws the projection 32 from the perforation 21, thus permitting the coil spring and the clip to be removed from the spring 10.

In that form of my invention shown in Figs. 5 and 6, a single comparatively long strip, preferably as long as and wider than the sinuous spring may be substituted for the plurality of comparatively short and separated clips 12. As shown in Fig. 5, the strip 8 is provided with a series of central perforations 40 similar to the perforation 21 and spaced apart to correspond to the spacing of the turns of the sinuous spring. Transversely aligned with each perforation 40 are the edge notches 41 and 42, said notches being alternated on the side edges of the strip throughout its length.

In assembling the parts, the strip 8 is arranged as shown underneath the sinuous spring, whereafter the axial part 32 of the coil spring is arranged underneath the selected perforation 40 and rotated to carry said part 32 into the perforation and to screw the parts tightly together with the end coil 31 passing through the selected notch 41 or 42. The width of the strip 8 may be considerably varied, provided that the notches 41 and 42 thereof extend sufficiently inwardly to permit the passage of the end coil 31 therethrough and thus to prevent loosening of the parts under stress or vibration.

In Fig. 6, I have shown the material which is removed from the strip 9 to form the notches 41 and 42, bent up in the form of lugs 43 corresponding to the lug 24 and functioning similarly thereto. In this case, it is immaterial whether or not the end coil 31 passes through the notch, since the lugs prevent any possibility of relative movement of the sinuous spring in any direction in the plane of the strip. It will be understood that only a limited number of such lugs 43 are required, though I have shown one for each notch.

In all the forms of the invention, no relative movement of the parts in any direction is possible even under considerable stresses though the parts may be separated by deliberate relative rotation when desired.

It will be seen that I have provided a simple but efficient device for holding one or more coil springs at any selected points on a sinuous spring, which device is designed to be adequately and securely connected to the springs with a minimum of labor and that I have provided a structure well designed to meet the requirements of practical use.

While I have shown and described certain specific embodiments of my invention, I do not wish to be understood as limiting myself thereto, but intend to claim the invention as broadly as may be permitted by the state of the prior art and the scope of the appended claims.

I claim:

1. In a spring structure, a sinuous spring having a plurality of substantially semi-circular bends therein joined by straight portions, a coil spring arranged at a selected one of said bends, an axially arranged portion at that part of the coil spring nearest the sinuous spring, and a sheet metal member engaging a face of the sinuous spring and arranged therewith between coils of the coil spring for maintaining said springs against relative movement, said member having a perforation therein receiving the axial portion of the coil spring and having an edge notch therein in transverse alignment with said perforation and receiving part of the end coil of the said coil spring, an end lug on said member arranged inside of and in contact with one of the bends of the sinuous spring, and side lugs on the member arranged inside of the respective bends adjacent the bend engaged by the said first mentioned lug.

2. A substantially flat and generally rectangular sheet metal member for use in holding a plurality of coil springs to any spaced selected bends of a sinuous spring, said member having a pair of parallel edges and having a series of longitudinally spaced perforations therein substantially midway between said edges for the reception of the axially arranged ends of the coil springs, said member also having a reentrant notch in at least one of said edges in transverse alignment with each of said perforations.

3. An elongated strip of sheet metal for use in holding a series of coil springs to any selected bends of a sinuous spring, said strip having a series of spaced perforations therein between its edges, and also having notches on its edge each in transverse alignment with one of said perforations.

4. The combination with a coil spring having an axially arranged end projection, of a one-piece clip for use in holding the coil spring to any selected point on a sinuous spring, said clip comprising a bottom having a substantially central perforation therein, the end part of the coil spring extending below said bottom and a pair of spaced flat lugs adjacent an end edge of said bottom, each of said lugs being of less width than the length of said side edges, and a flat lug outstanding from the central portion of the other end edge of said bottom, and a sinuous spring having a part thereof having a bend therein arranged between said pair of lugs and also between a coil of said coil spring and said bottom and with the bend thereof arranged outside of and in contact with said end edge lug, said lugs cooperating to determine the relative positions of and preventing relative movement of the clip and the sinuous spring in the plane of the bottom of the clip.

5. The combination with a coil spring having an axially arranged end projection, of a spring holding clip adapted to frictionally fit about a 180° bend of a sinuous spring and supporting the coil spring with the axis of said coil spring at substantially right angles to the plane of said bend, comprising a flat bottom portion, a flat lug upstanding integrally from the bottom portion at one end edge of said bottom portion, and a pair of upstanding flat lugs each integral with and upstanding from a side edge of the bottom portion and of less width than the length of said side edge and of less height than that of said first mentioned lug, said bottom portion having a substantially central perforation therein through which the end projection of the coil spring passes, the end part of the coil spring extending past said bottom portion, and a sinuous spring having a part thereof including said 180° bend arranged between said pair of lugs and between a coil of the coil spring and said bottom portion, with said bend outside of and in contact with the first mentioned flat lug, all of said lugs cooperating to position the clip on the sinuous spring.

6. A clip of a single piece of sheet metal having a flat bottom portion provided with a central perforation, a flat end lug outstanding integrally from one end of the bottom portion and at substantially right angles thereto, and a pair of spaced parallel side lugs outstanding from the bottom portion and arranged in planes at substantially right angles to those of the bottom portion and of said end lug, said side lugs being arranged adjacent the other end of the bottom portion.

7. A one-piece clip for use in holding a coil spring to any selected point of a sinuous spring, said clip having a pair of side lugs each of less length than that of said clip, a bottom portion integrally connecting said side lugs and having a perforation therein midway between said side lugs, and an end lug outstanding from one end of said bottom portion and arranged centrally between the side lugs, said bottom having a notch in the other end thereof in alignment with the perforation and the end lug.

8. In a spring structure, a sinuous spring having a plurality of substantially semi-circular bends therein joined by straight portions, a coil spring arranged at a selected one of said bends and engaging one face of the selected bend, an axially arranged projection at that end of the coil spring nearest the sinuous spring, and a sheet metal member engaging the other face of the selected bend for maintaining said springs against relative movement, said member having a perforation therein receiving the axial projection and having an edge notch therein in transverse alignment with said perforation, part of the end coil of the said coil spring passing through the notch and extending below said member.

9. In a spring structure, a sheet metal spring-engaging member having a plate-like portion provided with a perforation midway between the edges thereof, a coil spring, a sinuous spring between a coil of the coil spring and said plate-like portion, an end portion of the coil spring being arranged outwardly beyond the sinuous spring and at the outer face of the plate-like portion, said end portion terminating in a projection passing inwardly through the perforation, said coil spring compressing the sinuous spring and said member between said end portion and the succeeding coil of the coil spring.

10. In a spring structure, a sinuous spring having a plurality of substantially semi-circular bends therein joined by straight portions, a coil spring arranged at a selected one of said bends, an axially arranged projection at the end of the end coil of the coil spring, and a sheet metal member for maintaining said springs against relative movement, the sinuous spring and the member being arranged between the end coil of the coil spring and the next succeeding coil with the projection on one side of the members and said next succeeding coil on the other side of the member, said member having a perforation therein receiving the axial projection of the coil spring and having an edge notch therein in transverse alignment with said perforation and receiving part of the end coil of the said coil spring, and an outstanding lug on said member arranged inside of and in contact with one of the bends of the sinuous spring.

ABRAHAM KRAKAUER.